United States Patent Office 2,924,585
Patented Feb. 9, 1960

2,924,585

LINEAR POLYESTERS OF MERCAPTODICARBOXYLIC ACIDS, POLYMERS PREPARED THEREFROM, AND METHOD OF MAKING SAME

John V. Schmitz, Fullerton, Calif., assignor to General Electric Company, a corporation of New York No Drawing. Application October 5, 1956
Serial No. 614,088

9 Claims. (Cl. 260—45.4)

This invention relates to linear polyesters having mercaptan groups attached to carbon atoms on the linear chain, polymers including such linear polyesters, and the method of making such polyesters and polymers.

It is an object of the present invention to provide linear polyesters having thiol groups attached to carbon atoms in the linear chain and particularly polyesters of the type set forth having acid numbers less than about 20 percent of the theoretical acid number of the reactants.

Another object of the present invention is to provide linear polyesters of the type set forth in which the linear chain is saturated.

Still another object of the invention is to provide linear polyesters of the type set forth in which the linear chain includes reactive ethylenic double bonds.

Yet another object of the invention is to provide linear polyesters of the type set forth substantially equimolecular amounts of mercaptodicarboxylic acid and dihydric alcohol.

Another object of the present invention is to provide linear polyesters of the type set forth having improved solvent compatability.

Still another object of the present invention is to provide improved methods of forming linear polyesters of the type set forth.

Yet another object of the present invention is to provide solid polymers including polyesters of the type set forth.

In connection with the foregoing object it is another object of the invention to provide copolymers of the linear polyesters of the present invention and unsaturated polymers containing reactive ethylenic double bonds.

A further object of the invention is to provide polymerized products made from linear polyesters of the present invention in which the polyester contains both thiol groups and reactive ethylenic double bonds.

A still further object of the invention is to provide methods of making polymers of the type set forth.

It has been found that the above and other objects and advantages of the invention are achieved by providing a linear polyester of substantially equimolecular amounts of discarboxylic acid and dihydric alcohol having thiol groups attached to the carbon atoms in the linear chain, the polyester having an acid number less than about 20 percent of the theoretical acid number of the reactants. According to certain preferred embodiments of the invention, the linear chain is saturated and, according to other preferred embodiments of the invention, the linear chain includes active ethylenic double bonds. In general the linear polyesters of this invention can be incorporated in polymers and particularly in copolymerization polymers with unsaturated polymers containing reactive ethylenic double bonds. When the linear polyesters also contain a reactive ethylenic double bond, the polyester will undergo homopolymerization to provide a cross linked solid polymer.

In preparing the linear polyesters of the present invention the dicarboxylic acid and the dihydric alcohol are reacted in substantially equimolecular amounts and preferably in the presence of an acid catalyst under an inert atmosphere in the presence of a suitable codistillation liquid to remove the water of esterification as it is formed. The linear polyester so obtained can be reacted with other polymers containing reactive ethylenic double bonds or with itself when the polyester contains a reactive ethylenic double bond to provide solid polymers.

For purposes of illustration several specific examples will be given. It is to be understood that these examples are given by way of illustration and are not to be construed as a limitation upon the scope of the invention.

*Example 1*

A mixture of 0.5 mole of propylene glycol and 0.5 mole of thiomalic acid were placed in a reactor equipped with a stirrer, thermometer, a "Dean-Stark" trap and an inlet tube for nitrogen, 50 ml. of benzene and a catalytic amount of p-toluenesulfonic acid were added. The mixture was heated for seven hours at approximately 140° C. under a blanket of nitrogen. The benzene in cooperation with the "Dean-Stark" trap removed the water of esterification as it was formed without the loss of any reactants. The benzene was then removed by vacuum distillation at 100° C. The product of the reaction was a low molecular weight, viscous liquid. The acid number of the product was then determined by titration with potassium hydroxide in an aqueous acetone solution with a phenol red indicator. The acid number of this product was 25 expressed in mg. of potassium hydroxide per gram of product. The reactants have a theoretical acid number of 520 expressed in mg. of potassium hydroxide per gram of reactants. The product therefore has an acid number equal to approximately 4.8% of the theoretical acid number of the reactants.

The propylene glycol thiomalate formed in Example 1 further polymerized to form gels upon being heated in the presence of oxygen and also evidenced air-drying properties. The product of Example 1 when heated at 100° C for 16 hours developed a dry, but not tack-free, surface. The air-drying effect is accelerated by the use of small amounts of dryers, for example "nuodex" dryers and particularly cobalt "nuodex" which is a salt of naphthenic acid.

In certain instances it is desirable to have fewer thiol groups on the linear chain and in such cases a portion of the mercaptodicarboxylic acid can be replaced with an unsubstituted dicarboxylic acid. More specifically the thiomalic acid of Example 1 can be replaced in part with a dicarboxylic acid such as adipic acid. The following is an example of mixed ester polymer of this type.

*Example 2*

0.525 mole diethylene glycol, 0.10 mole thiomalic acid and 0.40 mole adipic acid were added to the reaction apparatus of Example 1. To this mixture was then added a catalytic amount of p-toluenesulfonic acid and 40 ml. of toluene. This mixture was heated at 130° C. for 7 hours. The toluene was then removed by vacuum distillation at 125° C. and the reaction product recovered. The yield was approximately 95% of the theoretical yield. The product was a viscous liquid and had an acid number of 29 expressed in mg. of potassium hydroxide per gram of polyester. The reactants have a theoretical acid number of 444 expressed in grams of potassium hydroxide per gram of reactants. The acid number of the products is therefore 6.5% of the theoretical acid number of the reactants. This product also exhibited air-drying properties.

In certain formulations it is desirable that a portion of the hydroxyl groups on the glycol be esterified with monocarboxy acids. For example lauric acid may be used in combination with a mercaptodicarboxylic acid and an unsubstituted dicarboxylic acid. The following is an example of such a formation.

Example 3

To the reaction apparatus of Example 1 was added 0.60 mole dipropylene glycol, 0.30 mole thiomalic acid, 0.20 mole adipic acid and 0.20 mole of lauric acid. A catalytic amount of p-toluenesulfonic acid and 40 ml. of toluene were added to this mixture. After closing the apparatus and establishing a blanket of nitrogen over the surface of the reactants, the mixture was heated at 140° C. for seven hours. The toluene was then removed by vacuum distillation and the product recovered. The polyester product was found to be a viscous liquid having an acid number of 43 expressed in mg. of potassium hydroxide per gram of product. The reactants have a theoretical acid number of approximately 364 expressed in mg. of potassium hydroxide per gram of reactant. The polyester product has an acid number therefore of approximately 8.5% of the theoretical acid number of the reactants.

Reactive ethylenic double bonds can be introduced into the linear chain of the polyester product by utilizing an unsaturated dicarboxylic acid or anhydride thereof or unsaturated monofunctional acid. For example maleic anhydride may be used in combination with thiomalic acid and other dicarboxylic acids such as adipic acids. The following are examples of products including a reactive ethylenic double bond in the polyester chain.

Example 4

In the reaction apparatus of Example 1, there was mixed 0.525 mole of diethylene glycol, 0.05 mole of thiomalic acid, 0.10 mole of maleic anhydride and 0.35 mole of adipic acid. To this mixture was added a catalytic amount of p-toluenesulfonic acid and 50 ml. of toluene. After establishing a blanket of nitrogen over the surface of the reactants, heat was applied and the mixture heated for 7 hours to a temperature of 140° C. The toluene was then removed by vacuum distillation. The resultant product was a viscous liquid having an acid number of 37 expressed in mg. of potassium hydroxide per gram of product. The reactants have a theoretical acid number of 451 expressed in mg. of potassium hydroxide per gram of reactant. Therefore, the product has an acid number equal to approximately 8.2% of the theoretical acid number of the reactants.

Example 5

The reaction of Example 4 was carried out using 1.05 moles of diethylene glycol, 0.10 mole of thiomalic acid, 0.30 mole of maleic anhydride and 0.60 mole of adipic acid. This mixture was heated with catalytic amounts of p-toluenesulfonic acid but without the addition of toluene. The acid number of the product was 63 expressed in mg. of potassium hydroxide per gram. The theoretical acid number of the reactants is approximately 461 and therefore the acid number of the product is approximately 13.6 percent of the theoretical acid number of the reactants.

Example 6

There is placed in the reaction apparatus of Example 1, 0.50 mole of diethylene glycol, 0.20 mole of thiomalic acid and 0.20 mole of maleic anhydride. To these reactants was added a catalytic amount of p-toluenesulfonic acid and 35 ml. of toluene. After the reaction was finished, the toluene was removed by vacuum distillation and the polyester product recovered.

The polyester products of Examples 4, 5 and 6 which contain both reactive ethylenic double bonds in the linear chain and mercaptan groups attached thereto will further polymerize under certain conditions. These products, for example, gel rapidly if free radical catalysts such as benzoyl peroxide or t-butyl perbenzoate are added thereto. If these polyesters are heated in the presence of oxygen they are quickly polymerized to form firm gels. The product of Example 5 gave a surface film in air after 20 minutes at room temperature or after five minutes at 70° C. This air-drying effect is accelerated by drying catalysts such as cobalt "nuodex."

Instead of the thiomalic acid specified in Examples 1 through 6, inclusive above, other mercaptodicarboxylic acids may be used. Examples of other monomercaptodicarboxylic acids are 2-mercaptoadipic acid, 2-mercaptosebacic acid, 2-mercaptopimelic acid, etc. The mercaptodicarboxylic acid may contain a plurality of mercapto groups as substituents, e.g., 2,3-dimercaptosuccinic acid, 2,5-dimercaptoadipic acid, 2,9-dimercaptosebacic acid, etc. Mercaptoglutaric acid, dicarboxylic acid derivatives of diphenol and thionapthol may also be used as may cyclic mercaptan-containing acids such as derivatives of cyclopentadienemaleic anhydride adduct and other maleic anhydride Diels-Alder adducts. Also useful are thiodicarboxylic acids such as thiocitric acid.

In addition to the propylene glycol illustrated in Example 1, other aliphatic dihydric alcohols may be used such as butylene glycol, octamethylene glycol, decamethylene glycol, hexamethylene glycol, 1,12-octadecamethylene glycol and the like. Higher polyhydric alcohols may be used in which all but two of the alcoholic hydroxyl groups have been esterified with a monocarboxylic acid. Suitable examples are the monoglycerides of hexanoic, octanoic, decanoic acids, etc. Alternatively the dihydric alcohol may include an ether linkage as do the diethylene glycol and the dipropylene glycol used in Examples 2 through 6. Other similar dihydric compounds may also be used. Other codistillation liquids can be used in place of the benzene and toluene illustrated in the examples. Preferably the codistillation liquid is aromatic in character such as other homologues of benzene.

The method illustrated in Figures 1 through 6 produces substantially no or very little cross linkage of the mercaptan groups or of the reactive ethylenic double bonds in the polyester containing such a bond. The yields in general were better than 95% of theoretical yield and the products as evidenced by the acid number are relatively long chain in character.

The reaction temperatures used will vary slightly depending upon whether a solvent is used and the character of the solvent. In general, reaction tetmperatures are between 125° C. and 150° C. and the reactions were carried out for from about five to about ten hours.

Other acid catalysts can be used besides the p-toluenesulfonic acid used in the examples. Examples of other suitable acid catalysts are phosphoric acid, polyphosphoric acid, perfluoro organic acids, methane sulfuric acid and benzenesulfonic acid.

Other dicarboxylic acids containing reactive ethylenic bonds may be used besides the maleic anhydride illustrated. For example fumaric acid, itaconic acid and Diels-Alder adducts of maleic anhydride can be used. Other dicarboxylic acids can be used to improve the solvent compatibility of the polyesters in place of the adipic acid of Examples 2 through 5, inclusive. Examples of additonal suitable acids are phthalic anhydride, isophthalic acid, terephthalic acid, HET acid, etc. Other methods for introducing double bonds are the use of a monoglyceride of unsaturated fatty acids or unsaturated fatty acid esters of polyhydric alcohols.

All of the polyester products were viscous liquids or semi-solids. They were light tan in color and had a distinct mercaptan odor. Each had an acid number less than about 20 percent of the theoretical acid number of the reactants expressed as mg. of potassium hydroxide per gram of product. It has been found that products made in accordance with the present invention having an acid number of less than about 20 percent of the theoretical acid number of the reactants possess the desirable and distinguishing properties and qualities of the present invention. These compounds can be air-dried to form films, can serve as cross linking agents further to polymerize other unsaturated polymers as will be explained more fully hereinafter, and when the polyesters contain both double bonds and mercaptan groups, they function as polymerization monomers and are further polymerizable to form gels. These compounds and polymers made therefrom are useful as potting compounds which exhibit low shrinkage upon polymerization, laminating compounds which polymerize without excessive evolution of heat, and in making flexible plastic foams which polymerize rapidly at low temperatures.

It will be noted from the molar concentrations of the ingredients in the foregoing examples, where the mercaptodicarboxylic acid is employed in combination with an aliphatic dicarboxylic acid free of any mercapto groups, the former comprises from 10 to 50 mol percent of the total molar concentration of the mixture of the mercaptodicarboxylic acid and the other non-mercapto-containing dicarboxylic acid.

The products of Examples 4, 5 and 6 above which contain both mercaptan groups and reactive ethylenic double bond will further polymerize in the presence of suitable catalysts such as peroxides to form gels. The following are examples of such reactions.

Example 7

A two inch layer of the diethylene glycol adipate-maleate-thiomalate polyester made in accordance with Example 4 above was placed in a test tube. 1% by weight of benzoyl peroxide was added and mixed with the polyester. The test tube was then immersed in a silicone oil bath and heated in an oven for one hour at 70° C. The product was a hard tough polymer pill which could not be melted or dissolved in toluene, was homogeneous in nature, and was characterized as a firm gel.

Example 8

Sufficient quantity of the diethylene glycol adipate-maleate-thiomalate made in accordance with Example 4 above was placed in a test tube to form a two inch layer. 1% by weight of t-butyl perbenzoate was added. The test tube was immersed in a silicone oil bath and heated in an oven at 30° C. for 180 minutes. The product was foamed and had a cellular structure consisting of small bubbles uniformly distributed throughout. The form of the product was a soft, short, cheesy polymer pill which further softened but did not melt upon the application of heat and could be swollen but not dissolved by toluene and could be designated a weak gel.

Example 9

The reactants of Example 8 were mixed as described and heated at 80° C. for five minutes. The product was a foamed weak gel similar in character to that of Example 8.

Example 10

The reactants of Example 8 were heated at 80° C. for 90 minutes. The product was a foamed rubber gel in the form of a soft, short, cheesy polymer pill which further softened but did not melt upon the application of heat and could be swollen but not dissolved by toluene. This product was capable of elongation without fracture.

Example 11

A quantity of the diethylene glycol maleate-thiomalate of Example 6 was added to a test tube sufficient to form a two inch layer. 1% by weight of t-butyl perbenzoate was added. The test tube was then immersed in a silicone oil bath and heated in an oven at 30° C. for three minutes. The product was a foamed rubbery gel in the form of a soft, short, cheesy polymer pill which further softened but did not melt upon application of heat and was swollen but not dissolved by toluene. The polymer gel was capable of elongation without fracture.

Example 12

The diethylene glycol maleate-thiomalate polyester made in accordance with Example 6 above was added to a test tube in a quantity sufficient to provide a two inch layer in the bottom thereof. 1% by weight of benzoyl peroxide was then added. The test tube was immersed in a silicone oil bath and heated in an oven at 60° C. for thirty minutes. The product was a weak rubbery gel.

From the character of the products obtained in Examples 7, 8, 9, 10, 11 and 12 above it is ascertained that the polyesters have been cross linked resulting in polymers which are gels that are infusible and insoluble in toluene and similar solvents. Other polyesters including mercaptan groups on the linear chain and reactive ethylenic double bonds in the linear chain can be similarly polymerized to form gels. Other suitable cross linking catalysts can be used and other peroxides can be used in addition to those given in the examples.

The mercaptan containing polyesters of the present invention can be used to cross link unsaturated polymers containing reactive double bonds or unsaturated alkyd resins. More specifically the propylene glycol thiomalate of Example 1 above, the diethylene glycol adipate-thiomalate-laurate of Example 3 can be used to cross link unsaturated polymers such as butadiene-styrene copolymers, diethylene glycol maleate and diethylene glycol adipate-maleate. The following are examples of methods of cross linking unsaturated polymers using the mercaptan containing polyesters of the present invention.

Example 13

To a beaker was added one part by weight of propylene glycol thiomalate made in accordance with Example 1 above. A solution was then made by dispersing one part by weight of butadiene-styrene (10:90) copolymer in an equal weight of benzene. This solution was then added to the beaker containing the propylene glycol-thiomalate and the mixture stirred until homogeneous. The homogeneous mixture was then cast in a film in an aluminum dish and the solvent evaporated during curing. The film was cured in air at 100° C. for twelve hours. The cured film was tough, resistant to toluene and mar resistant.

Example 14

There was placed in a beaker one part by weight of diethylene glycol-adipate-thiomalate. Then one part by weight of a 1:1 dispersion of butadiene-styrene (10:90) copolymer in benzene was prepared and added to the beaker. 1% by weight of cobalt "nuodex" was then added. The resultant mixture was stirred until homogeneous after which the mixture was cast in a film in an aluminum dish. The solvent was evaporated during drying of the film in air at 80° C. for fifteen hours. The resultant cured film was a firm gel which was swollen but not dissolved by toluene.

Example 15

A quantity of diethylene glycol adipate-maleate was prepared in the following manner. To a reaction apparatus of the type described above in Example 1 was added 0.525 mole of diethylene glycol, 0.13 mole of maleic anhydride and 0.37 mole of adipic acid. To this mixture was added 5 ml. of toluene. After establishing a nitrogen blanket over the surface of the mixture, it was heated for seven hours to a temperature of 130° C. The toluene was then removed by vacuum distillation and the product recovered. The product was a viscous liquid having an acid number of 17 expressed in mg. of potassium hydroxide per gram of product.

The diethylene glycol adipate-maleate was then placed in a beaker to which was also added an equal amount by weight of diethylene glycol adipate-thiomalate. This mixture was then stirred until homogeneous. The homogeneous mixture was cast in a film in an aluminum dish and the film dried in air at 30° C. for fifteen hours. The resultant dried film was a weak gel that was fragile (short and cheesy) and was swollen but not dissolved by toluene.

*Example 16*

A homogeneous mixture was prepared as in Example 15 above and the mixture cast in a film in an aluminum dish. The cast film was then dried in air at 80° C. for fifteen hours. The dried film was a firm gel that was tough and was swollen but not dissolved by toluene.

*Example 17*

To a beaker were added one part by weight of propylene glycol thiomalate made in accordance with Example 1 above. Also added to the beaker were nine parts by weight of diethylene glycol maleate and 1% by weight of benzoyl peroxide. This mixture was stirred until homogeneous after which a portion of the mixture was poured into a test tube to form a two inch layer. The test tube was then immersed in a silicone oil bath and heated in an oven at 70° C. for ten minutes. The resultant product was a firm gel that was hard, tough and could not be melted or dissolved in toluene.

*Example 18*

To a beaker were added 9 parts by weight of diethylene glycol maleate and 1 part by weight of diethylene glycol adipate-thiomalate. Also added to the beaker was 1% by weight of the mixture of benzoyl peroxide. The resultant mixture was stirred until homogeneous. After stirring, the mixture was added to a test tube to form a two inch layer. The test tube was then immersed in a silicone oil bath and heated at 70° C. for fifteen hours. The cured product was a weak gel that was soft, short, cheesy, infusible and swollen but was not dissolved by toluene.

It will be seen that there have been provided new linear polyesters having mercaptan groups attached to carbon atoms on the linear chain, polymers including such linear polyesters, and methods of making such polyesters which fulfill the objects and advantages set forth above. More specifically there have been provided new linear polyesters having thiol groups attached to carbon atoms in the linear chain in which the polyesters have acid numbers less than 20 percent of the theoretical acid number of the reactants. The low acid numbers of the products indicate a high degree of reaction. In general the products of this invention show a reaction of 85 to 95 percent of the carboxylic groups of the reactants. There also are very little or no side reactions taking place. It is thought that this high degree of reaction of the carboxylic groups and the absence of side reactions are due in large measure to the improved method of reacting utilized in the present invention.

In general the polyesters of the present invention are relatively low molecular weight viscous liquids or semi-solids. They are light tan in color and exhibit a distinct mercaptan odor. Such polyesters are useful as potting compounds which exhibit low shrinkage on polymerization. Laminating resins can also be made from these polyesters, the resins being capable of polymerizing without excessive evolution of heat. Flexible plastic foams also can be formed from these polyesters, the foams polymerizing rapidly at low temperatures.

The linear polyesters may include linear chains that are saturated or may contain linear chains including reactive ethylenic double bonds. When the polyesters include reactive ethylenic double bonds the polyester will undergo homopolymerization to provide a cross linked solid polymer. Both saturated and unsaturated products can be incorporated in polymers and particularly in co-polymerization polymers with unsaturated polymers containing reactive ethylenic double bonds.

Although certain preferred forms and examples of the invention have been shown for purposes of illustration, it is to be understood that various changes and modifications can be made therein without departing from the spirit and scope thereof. Accordingly, the invention is to be limited only as set forth in the following claims.

I claim:

1. A linear polyester of substantially equimolecular amounts of diethylene glycol and a mixture of thiomalic acid and adipic acid, the thiomalic acid being present in an amount equal to from 10 to 50 mol percent of the total molar concentration of the latter and the adipic acid and the polyester having an acid number less than about 20% of the theoretical acid number of the reactants.

2. The homopolymerization product of a linear polyester of substantially equimolecular amounts of (a) diethylene glycol and (b) a mixture of thiomalic acid and maleic anhydride, the thiomalic acid being present in an amount equal to from 10 to 50 mol percent of the total molar concentration of the latter and the maleic anhydride, the polyester before homopolymerization having an acid number of less than about 20% of the theoretical acid number of the reactants.

3. The homopolymerization product of a linear polyester of substantially equimolecular amounts of (1) diethylene glycol and (2) a mixture of dicarboxylic acids composed of thiomalic acid, maleic anhydride, and adipic acid, the thiomalic acid being present in an amount equal to from 10 to 50 mol percent of the total molar concentration of the latter and the maleic anhydride and adipic acid, said polyester before homopolymerization having an acid number of less than about 20% of the theoretical acid number of the reactants.

4. A linear polyester obtained from substantially equimolecular amounts of (1) a mixture of (a) an aliphatic mercaptodicarboxylic acid in which the mercapto group is an —SH group and the carboxy groups are —COOH, and (b) an aliphatic dicarboxylic acid free of any mercapto groups selected from the class consisting of ethylenically unsaturated aliphatic dicarboxylic acids, saturated aliphatic dicarboxylic acids, and mixtures of such acids, and (2) an aliphatic dihydric alcohol, the mercaptodicarboxylic acid being present in an amount equal to from 10 to 50 mol percent of the total molar concentration of the latter and the other aliphatic dicarboxylic acid free of mercapto groups, the polyester having an acid number less than about 20 percent of the theoretical acid number of the reactants.

5. The copolymerization product of an unsaturated alkyd resin obtained by the reaction of a polyhydric alcohol and an unsaturated α,β-dicarboxylic acid, the said unsaturated alkyd resin being free of mercapto groups, with a linear polyester obtained from substantially equimolecular amounts of (1) a mixture of (a) an aliphatic mercaptodicarboxylic acid in which the mercapto group is an —SH group and the carboxy groups are —COOH, and (b) an aliphatic dicarboxylic acid free of any mercapto groups selected from the class consisting of ethylenically unsaturated aliphatic dicarboxylic acids, saturated aliphatic dicarboxylic acids, and mixtures of such acids, and (2) an aliphatic dihydric alcohol, the mercaptodicarboxylic acid being present in an amount equal to from 10 to 50 mol percent of the total molar concentration of the latter and the other aliphatic dicarboxylic acid free of any mercapto groups, the polyester having an acid number less than about 20 percent of the theoretical acid number of the reactants.

6. The copolymerization product of an unsaturated alkyd resin obtained by the reaction of (1) a polyhydric alcohol and an unsaturated α,β-dicarboxylic acid, the said unsaturated alkyd resin being free of mercapto groups, with (2) a linear polyester obtained from substantially equimolecular amounts of (a) diethylene glycol and (b)

a mixture of thiomalic acid and adipic acid, the thiomalic acid being present in an amount equal to from 10 to 50 mol percent of the total molar concentration of the latter and the adipic acid, the polyester having an acid number less than about 20 percent of the theoretical acid number of the reactants.

7. The homopolymerization product of a linear polyester obtained from substantially equimolecular amounts of (1) a mixture of (a) an aliphatic mercaptodicarboxylic acid in which the mercapto group is an —SH group and the carboxy groups are —COOH, and (b) an aliphatic dicarboxylic acid free of any mercapto groups selected from the class consisting of ethylenically unsaturated aliphatic dicarboxylic acids, saturated aliphatic dicarboxylic acids, and mixtures of such acids, and (2) an aliphatic dihydric alcohol, the mercaptodicarboxylic acid being present in an amount equal to from 10 to 50 mol percent of the total molar concentration of the latter and the other aliphatic dicarboxylic acid free of mercapto groups, the polyester having an acid number less than about 20 percent of the theoretical acid number of the reactants.

8. A linear polyester of substantially equimolecular proportions of (1) diethylene glycol and (2) a mixture of thiomalic acid and maleic anhydride, the thiomalic acid being present in an amount equal to from 10–50 mol percent of the total molar concentration of the latter and the maleic anhydride, the polyester having an acid number of less than about 20 percent of the theoretical acid number of the reactants.

9. A linear polyester of substantially equimolecular proportions of (1) diethylene glycol and (2) a mixture of thiomalic acid, maleic anhydride, and adipic acid, the thiomalic acid being present in an amount equal to from 10–50 mol percent of the total molar concentration of the latter, the maleic anhydride and the adipic acid, the polyester having an acid number less than about 20 percent of the theoretical acid number of the reactants.

References Cited in the file of this patent

UNITED STATES PATENTS

| | | |
|---|---|---|
| 2,221,418 | Weihe | Nov. 12, 1940 |
| 2,411,954 | Burke | Dec. 3, 1946 |
| 2,456,314 | Pratt | Dec. 14, 1948 |
| 2,476,891 | Mortenson | July 19, 1949 |
| 2,527,374 | Patrick | Oct. 24, 1950 |
| 2,563,133 | Patrick | Aug. 7, 1951 |